United States Patent [19]
Yamamoto et al.

[11] Patent Number: 5,630,612
[45] Date of Patent: May 20, 1997

[54] AIR BAG DEVICE

[75] Inventors: Tadashi Yamamoto; Norinari Nagata, both of Aichi, Japan

[73] Assignee: Toyoda Gosei Co., Ltd., Aichi, Japan

[21] Appl. No.: 602,447

[22] Filed: Feb. 16, 1996

[30] Foreign Application Priority Data

Feb. 22, 1995 [JP] Japan .................. 7-033796

[51] Int. Cl.$^6$ .................. B60R 21/16
[52] U.S. Cl. .................. 280/728.2; 280/731
[58] Field of Search .................. 280/728.2, 731, 280/728.1, 743.1, 728.3

[56] References Cited

U.S. PATENT DOCUMENTS

| | | | |
|---|---|---|---|
| 5,186,490 | 2/1993 | Adams | 280/731 |
| 5,280,946 | 1/1994 | Adams et al. | 280/728.2 |
| 5,290,059 | 3/1994 | Smith et al. | 280/728.2 |
| 5,338,060 | 8/1994 | Soderquist | 280/728.2 |
| 5,520,409 | 3/1996 | Saderholm | 280/231 X |

FOREIGN PATENT DOCUMENTS

| | | |
|---|---|---|
| 0572125 | 12/1993 | European Pat. Off. .......... 280/731 |
| 0602784A2 | 6/1994 | European Pat. Off. . |
| 0184545 | 1/1987 | Japan ........................ 280/728.2 |
| 0133267 | 11/1988 | Japan ........................ 280/728.2 |
| 4-365652 | 12/1992 | Japan . |
| 5-139236 | 6/1993 | Japan . |

OTHER PUBLICATIONS

Patent Abstracts of Japan, JP5139236, Jun. 1993, Koichi, Pad of Air Bag Device.
European Search Report, Sep. 13, 1996.

*Primary Examiner*—Christopher P. Ellis
*Attorney, Agent, or Firm*—Cushman Darby & Cushman IP Group of Pillsbury Madison & Sutro, LLP

[57] ABSTRACT

An air bag cover is held by the bag holder in such a manner that the respective side walls of the cover are secured to their corresponding securing piece portions of the vertical walls of the bag holder. The front and rear side walls of the cover respectively include securing grooves to which the front and rear securing piece portions of the bag holder are to be secured. The opening width dimension of the securing groove is set a little smaller than the height dimension of its corresponding securing piece portion, while the opening width dimension of the securing groove is set a little larger than the height dimension of its corresponding securing piece portion. The right and left side walls respectively include securing projecting strips to which the right and left securing piece portions of the bag holder can be secured.

11 Claims, 9 Drawing Sheets

AIR BAG DEVICE

FIELD OF THE INVENTION

The present invention relates to an air bag device which is disposed in a steering wheel, a seat, a door and the like of a vehicle and, in particular, to an air bag device which is held in such a state that a cover for covering a folded air bag is secured to and held by a bag holder for holding the air bag.

BACKGROUND OF THE INVENTION

A conventional air bag device is shown in FIG. 1 (see Japanese Patent Publications No. Hei. 4-365652, No. Hei. 5-139236, and the like).

This conventional air bag device M0 includes an air bag 1 formed as a folded bag, an inflator 2 for supplying gas for expansion of the folded air bag 1, an outer cover 3, and a bag holder 6 to which the air bag 1, inflator 2 and cover 3 are all secured.

The cover 3 comprises a top wall 4, including a predetermined breakable portion 4a formed in a substantially H-shaped configuration when viewed from the top surface of wall 4. Portion 4a will be broken when the air bag 1 is expanded. Cover 3 also includes four side walls 5 which are respectively disposed at right, left, front and rear positions around the periphery of the predetermined breakable portion 4a on the lower surface of top wall 4. Side walls 5 also extend substantially in a quadrangular prism shape. Each of the four side walls 5 includes a securing groove 5a on an inner peripheral surface thereof, while each of the front and rear side walls 5F and 5B includes an insertion groove 5d on the lower end face thereof.

The bag holder 6 comprises a bottom wall 7 for holding the air bag 1 and four vertical walls 8 which extend upwardly from the respective front, rear, right and left peripheral edges of the bottom wall 7. Walls 8 are also disposed on the inner peripheral side surfaces of the respective side walls 5. Each of the four vertical walls 8 includes at the upper end thereof a downwardly bent securing piece portion 8a on the outer peripheral side thereof.

Cover 3 can be held by the bag holder 6 in the following manner. The securing piece portions 8a of the respective vertical walls 8 are inserted into corresponding securing grooves 5a of the respective side walls 5. Then, brackets 9 are inserted into grooves 5d on the front and rear side walls 5F and 5B and thereafter fixed to the bag holder 6. The front and rear side walls 5F and 5B are held by the vertical walls 8F and 8B and brackets 9, so that the cover 3 can be held by the bag holder.

Also, an annular retainer 10, disposed within the air bag 1, includes a plurality of bolts (not shown) which respectively project downward. Accordingly, to assemble the air bag 1, inflator 2 and brackets 9 to the bag holder 6, these bolts may be respectively inserted into the air bag 1, inflator 2, bag holder bottom wall 7 and brackets 9, and then threadedly engaged with and fixed by nuts.

The reason why the two front and rear side walls 5F and 5B are selected as the portions to be held by use of the brackets 9 from among the four side walls 5 of cover 3 is that, when the air bag 1 is expanded and the top wall 4 opens, the front and rear door portions 4b and 4c of the top wall 4, enclosed by the substantially H-shaped predetermined breakable portion 4a, also open and the tensile forces thereof produced when the door portions 4b and 4c open act strongly in an outward or upward direction. This gives rise of the need to strongly retain the side walls 5F and 5B situated just below the front and rear door portions 4b and 4c.

In the conventional air bag device M0, the securing grooves 5a, to which the corresponding securing piece portions 8a of the bag holder 6 are to be secured, are all formed uniformly in the four side walls 5 of the cover 3 that extend in a substantially quadrangular prism shape.

The cross-sectional shape of every securing groove 5a, as shown in FIG. 2, is such that the height dimension h0 of the interior space 5b of the securing groove 5a is equal to the height dimension H0 of the securing piece portion 8a, while the width dimension h1 of the opening 5c thereof is smaller than the height dimension H0 of the securing piece portion 8a.

Therefore, in the conventional air bag device M0, it takes time and labor to insert and secure the securing piece portions 8a to their respective securing grooves 5a of the four side walls 5. This results in poor assembling of the cover 3 to the bag holder 6. Especially, for the purpose of reducing the cost of the cover 3, if the material of the cover 3 is changed from soft urethane to thermoplastic elastomer, such as polyolefin system material or the like, then the cover 3 is a little harder, which further lowers the ease of assembly of cover 3 to bag holder 6.

SUMMARY OF THE INVENTION

The present invention aims at solving the above problems found in the conventional air bag device M0. Accordingly, it is an object of the invention to provide an air bag device in which a cover for covering an air bag can be smoothly assembled to a bag holder to thereby improve the assembly of the cover but also reduces the number of manufacturing steps and the manufacturing cost of the air bag device.

According to a first aspect of the invention, there is provided with an air bag device comprising a folded air bag and a cover for covering the air bag. The cover comprises a top wall which includes a predetermined breakable portion that will be broken when the air bag is expanded. The cover also includes four sidewalls including front, rear, right and left side walls respectively disposed about the periphery of the breakable portion and extending downwardly from the lower surface of the top wall. Securing grooves are formed on the inner peripheral side surfaces of the front and rear side walls. The air bag device also includes a bag holder, for holding the air bag, comprising a bottom wall, four vertical walls extending upwardly from the respective front, rear, right and left peripheral edges of the bottom wall and disposed on the inner peripheral side surfaces of the respective side walls. The respective vertical walls include on their upper ends securing piece portions that are bent downwardly on the outer peripheral surface sides of the respective vertical walls. Front and rear securing piece portions are inserted and secured to the securing grooves so that the cover is held by the bag holder. The width dimension of an opening in the securing groove of one of the front and rear side walls is set to be substantially smaller than the height dimension of the securing piece portion. The width dimension of the securing groove of the other of the front and rear side walls is set to be substantially larger than the height dimension of the securing piece portion. Further, security projection strips are provided on the inner peripheral surface sides of the right and left side walls of the cover to which the right and left securing piece portions are secured.

According to a second aspect of the invention, the predetermined breakable portion of the cover is arranged in a substantially H-like shape as view from above, and brackets, fixed to the bag holder, are respectively inserted into the lower end faces of the front and rear side walls of the cover. The cover is held by the bag holder by securing the respective securing piece portions to the respective securing grooves as well as by holding the front and rear vertical walls and the brackets to the front and rear side walls.

According to a third aspect of the invention, the predetermined breakable portion of the cover is arranged in a substantially H-like shape as view from the top surface thereof, and brackets, fixed to the bag holder, are respectively inserted into the lower end faces of the securing projecting strips. The cover is held by the bag holder by securing the respective securing piece portions to the respective securing grooves as well as by holding the brackets to the securing projection strips.

According to a fourth aspect of the invention, a guide surface is formed adjacent the upper edge of the securing groove of the other of the side walls of the cover for guiding the securing piece portion of the corresponding vertical wall of the bag holder to the securing groove of the other of the side walls.

According to a fifth aspect of the invention, in the securing piece portions of the right and left vertical walls of the bag holder, there are provided securing projections which respectively project downward, and in the securing projecting strips of the right and left side walls of the cover, there are formed penetration holes into which the securing projections can be inserted.

Other objects, features, and characteristics of the present invention will become apparent upon consideration of the following description in the appended claims with reference to the accompanying drawings, all of which form a part of the specification, and wherein referenced numerals designate corresponding parts in the various figures.

DETAILED DESCRIPTION OF THE PREFERRED EMBODIMENT

Figure 1:
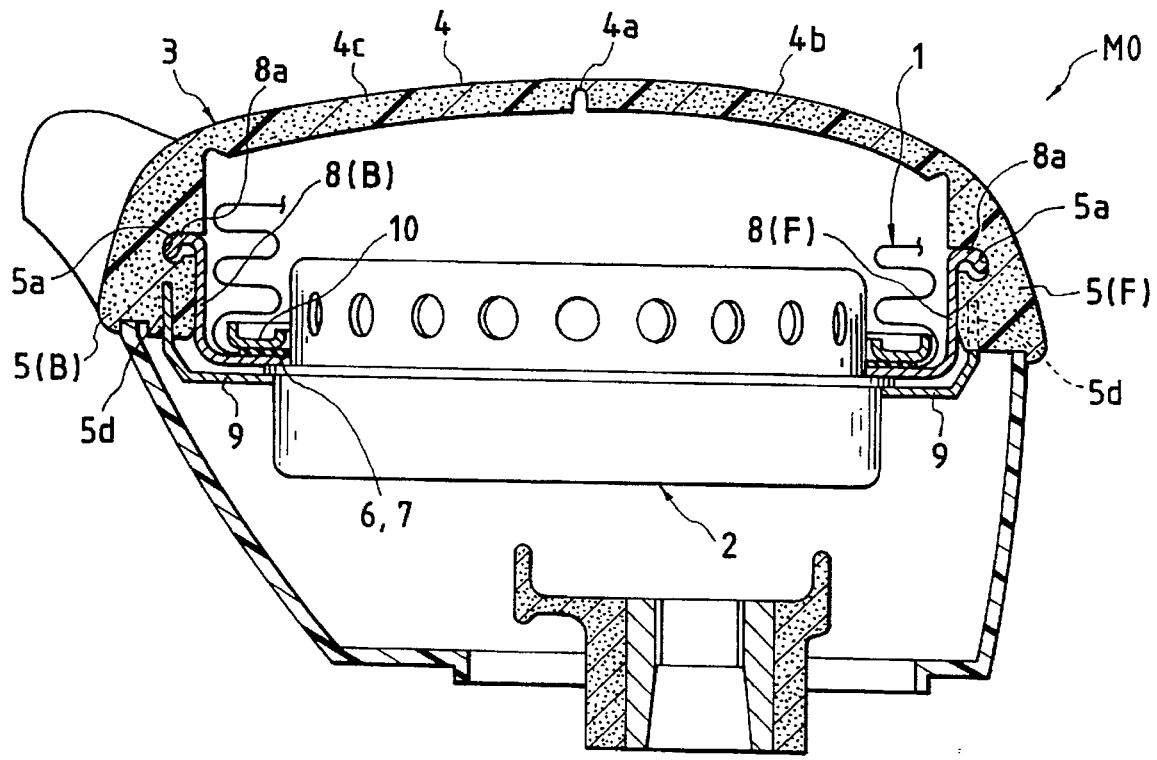
FIG. 1 is a cross-sectional view of a conventional air bag device.
Figure 2:
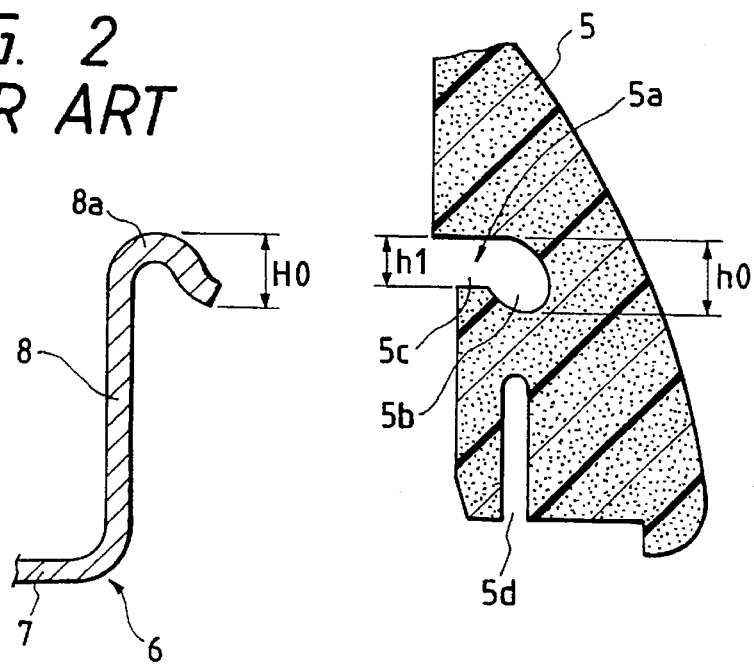
FIG. 2 is an enlarged partial cross-sectional view of the conventional air bag device, showing the dimensional relationship between a securing groove and a securing piece portion.
Figure 3:
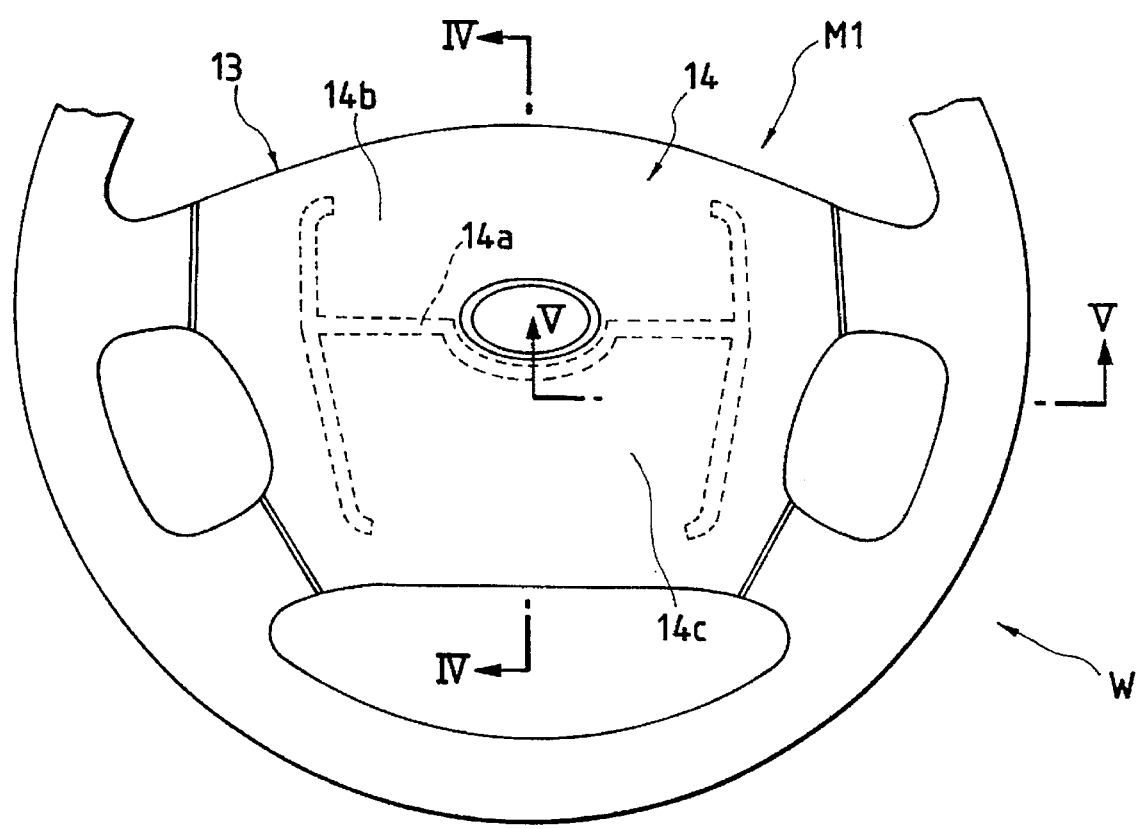
FIG. 3 is a cutaway top plan view of a steering wheel incorporating therein an embodiment of an air bag device according to the invention.
Figure 4:
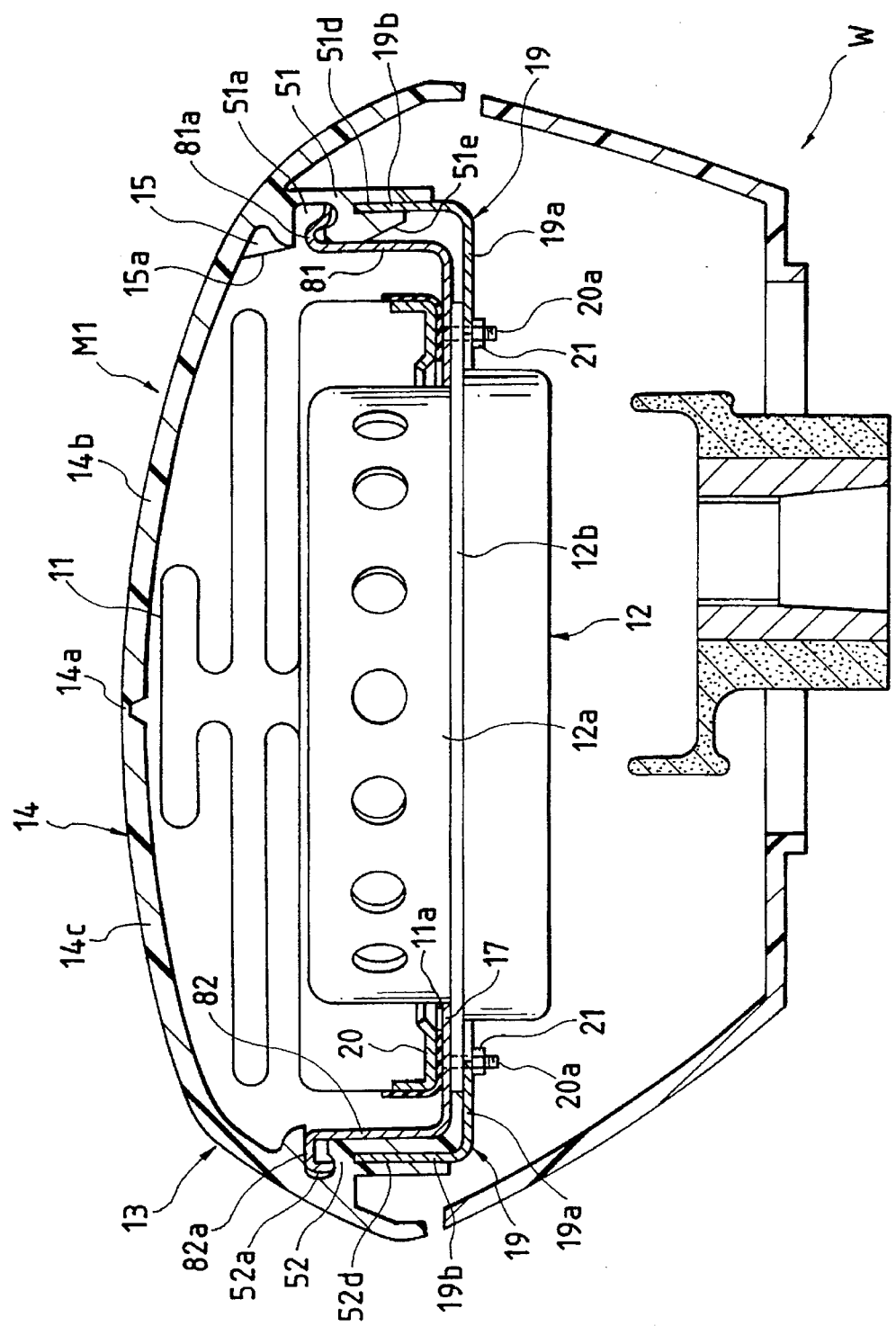
FIG. 4 is a cross-sectional view taken along the line IV—IV in FIG. 3.
Figure 5:
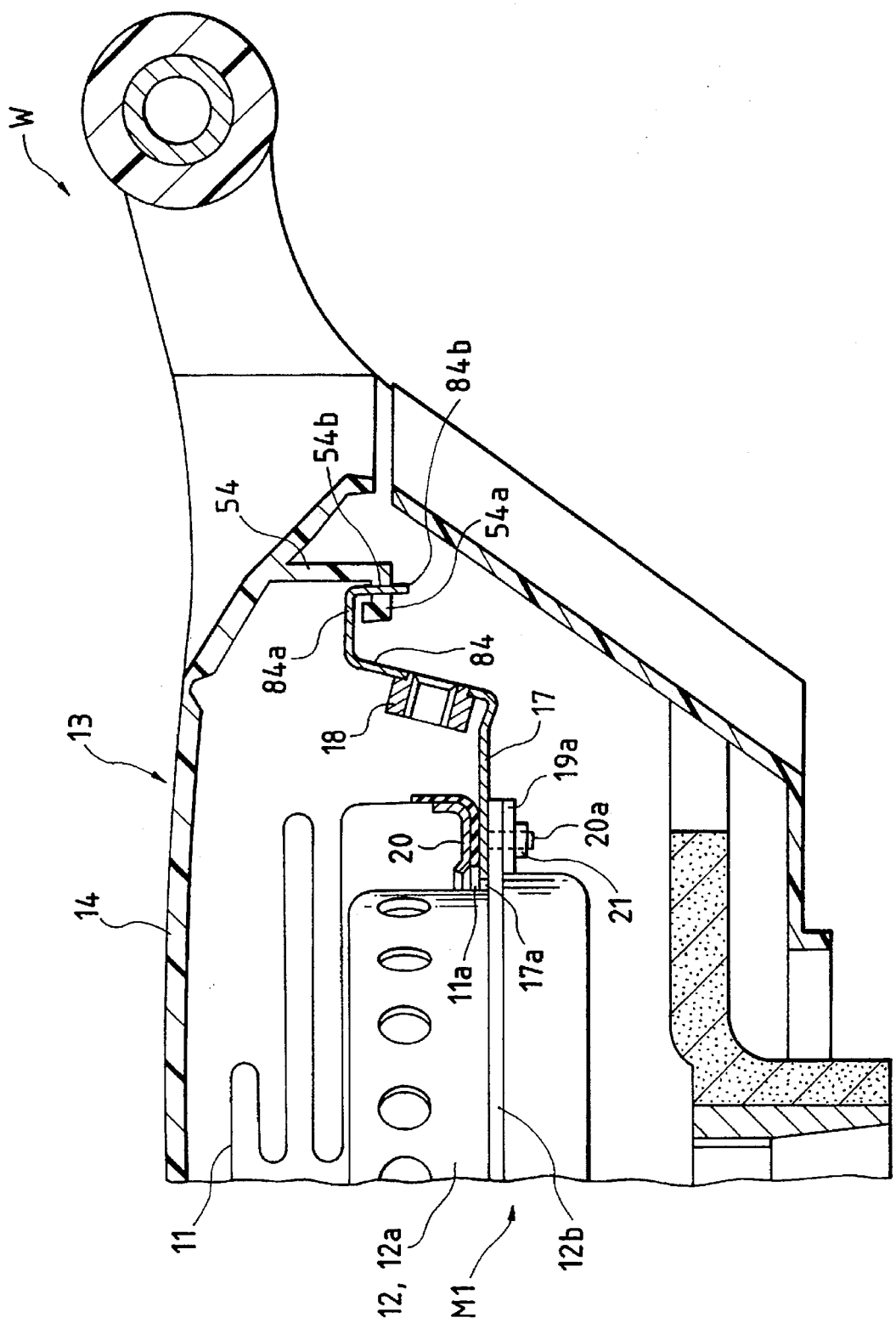
FIG. 5 is a cross-sectional view taken along the line V—V in FIG. 3.

As shown in FIGS. 3 to 5, an air bag device M1 according to the present embodiment is designed to be disposed in the central upper portion of a steering wheel W. The air bag device M1 comprises a folded air bag 11, an inflator 12 for supplying gas for expansion of the air bag 11, a cover 13 for covering the folded air bag 11, and a bag holder 16 for holding all of the air bag 11, the inflator 12 and cover 13.

The air bag 11 and inflator 12 are similar in structure to the conventional ones, and are held by bag holder 16 using a substantially annular retainer 20 including four bolts 20a disposed within the air bag 11 and projecting downward, and four nuts 21 which can be respectively brought into threaded engagement with the above bolts 20a.

In particular, the respective bolts 20a of the retainer 20 are inserted through the peripheral edge of an opening 11a formed in the air bag 11, a flange portion 12b formed in the outer periphery of a main body 12a of the inflator 12, the bottom wall 17 of the bag holder 16, and brackets 19, and are then threadedly engaged with and secured by the nuts 21, whereby the respective parts can be held by the bag holder 16.

Figure 6:
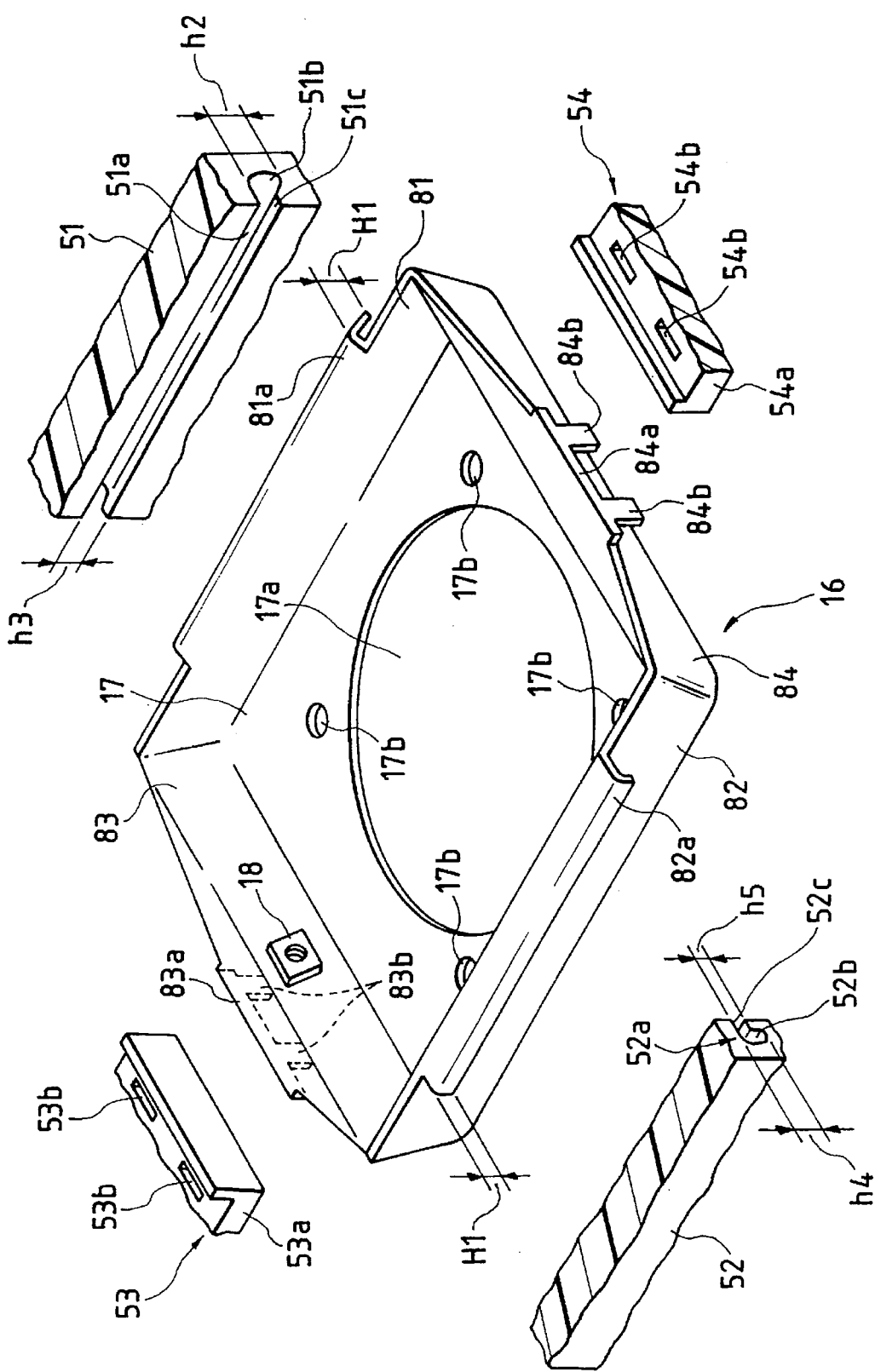
FIG. 6 is an exploded perspective view of a bag holder and the side walls of a cover employed in the invention.

Bag holder 16 of the air bag device M1 according to the present embodiment, as shown in FIGS. 4 to 6, is formed from a metal plate and includes a substantially rectangular bottom wall 17, and four vertical walls 81, 82, 83 and 84, respectively, extending upwardly from the peripheral edge of bottom wall 17.

Bottom wall 17 includes a centrally positioned insertion hole 17a through which the main body 12a of inflator 12 can be inserted from below. Four through holes 17b are respectively formed in the peripheral edge of insertion hole 17a and through which the four bolts 20a of the retainer 20 can be respectively inserted.

The vertical walls 81 and 82, are disposed along the front and rear portions of the air bag holder 16, respectively, and they include on their respective upper ends thereof securing piece portions 81a and 82a which are bent outwardly and downwardly on the outer peripheral sides thereof. On the other hand, the vertical walls 83 and 84, which are disposed on the right and left end portions of the air bag holder 16, respectively include on their upper ends side securing piece portions 83a and 84a which project horizontally outwardly and then extend downwardly. The securing piece portions 83a and 84a respectively also include at two positions on the ends thereof securing projections 83b and 84b, respectively, that project downwardly.

The front and rear securing piece portions 81a and 82a are substantially similar in shape to each other and the height dimensions H1 of the front and rear securing piece portions 81a and 82a, in the present embodiment, are both set for 3.5 mm (see FIG. 6).

Also, in the right and left vertical walls 83 and 84, there are formed holes (the reference characters thereof are not shown), while nuts 18 are respectively fixed to the positions of the through holes and cause the air bag device M1 to be fixed to the steering wheel.

As shown in FIGS. 3 to 7, cover 13 is formed of thermoplastic elastomer, such as polyolefin system material or the like, and includes a top wall 14 and four side walls 51, 52, 53 and 54 which extend downwardly from the lower surface of the top wall 14 in a substantially quadrangular prism shape.

Top wall 14 includes a thin, predetermined breakable portion 14a which is to be broken when the air bag 11 expands and which also has a substantially H-shaped configuration when viewed from the top surface thereof. When the predetermined breakable portion 14a is broken, similarly to the conventional air bag device, the door portion 14b of the ceiling wall 14 on the front side thereof and the door portion 14c of the ceiling wall 14 on the rear side thereof are opened outwardly but in mutually opposite directions.

The front and rear side walls 51 and 52 of cover 13 respectively include, on the inner peripheral side surfaces thereof, front and rear securing grooves 51a and 52a to which the front and rear securing piece portions 81a and 82a of the corresponding vertical walls 81 and 82 can be inserted and secured. In the respective lower end faces of side walls 51, 52, insertion grooves 51d and 52d are also provided into which the brackets 19 can be inserted.

The height dimension h2 of the interior space 51b of the front securing groove 51a on the front side wall 51 and the width dimension h3 of the opening 51c thereof are set larger than the height dimension H1 of the front securing piece portion 81a (see FIG. 6). In the present embodiment, the height dimension h2 of the interior space 51b is preferably 6 mm, while the width dimension h3 of the opening 51c is preferably The height dimension h4 of the interior space 52b of the rear securing groove 52a of the rear side wall 52 is set a little larger than the height dimension H1 of the rear securing piece portion 82a, while the width dimension h5 of the opening 52c is set a little smaller than the height dimension of the securing piece portion 82a (see FIG. 6). In the present embodiment, the height dimension h4 of the interior space 52b is preferably 4 mm, while the width dimension h5 of the opening 52c is preferably 3 mm.

The right and left side walls 53 and 54, respectively, include on their inner peripheral side surfaces securing projection strips 53a and 54a which can be secured to the securing piece portions 83a and 84a of the corresponding vertical walls 83 and 84. The securing projection strips 53a and 54a are, respectively, formed in a substantially L-shaped configuration which projects in a horizontal direction and then extend slightly upwardly at the leading end portion thereof. Further, each of the securing projection strips 53a and 54a also include a pair of spaced apart penetration holes 53b and 54b in such a manner that they respectively extend through the securing projection strips 53a and 54a. Securing projections 83b and 84b, respectively formed in the securing piece portions 83a and 84a, are formed so that they may be inserted into the penetration holes 53b and 54b.

Figure 7:
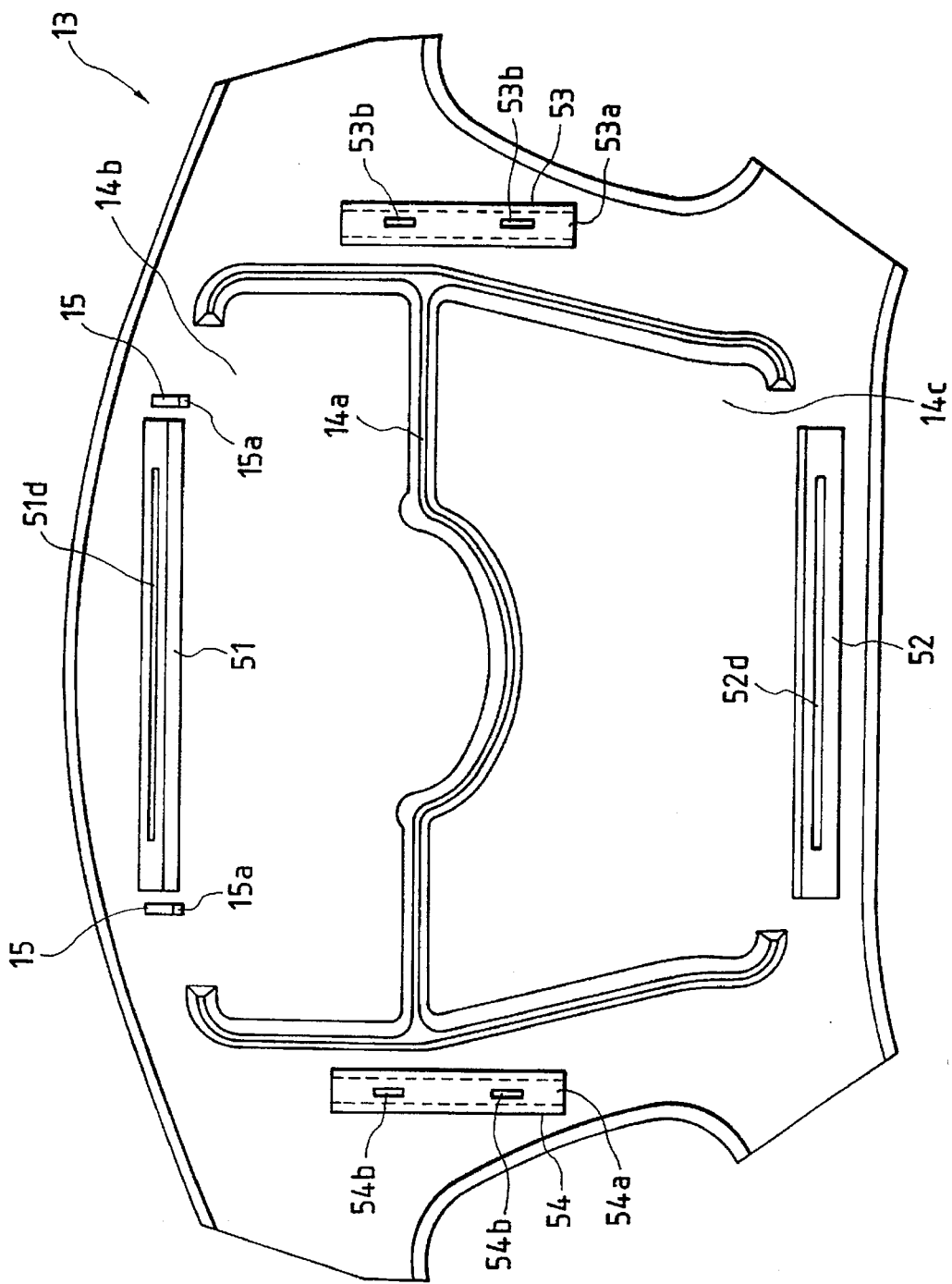
FIG. 7 is a bottom view of the cover of the invention.

Also, in the side portions on the upper edge side of the securing groove 51a of the front side wall 51, as shown in FIGS. 4 and 7, there are provided guide ribs 15 each of which include inclined guide surfaces 15a. The guide surfaces 15a of the respective guide ribs 15 are formed so as to connect the lower surface of top wall 14 with the upper edge side of the securing groove 51a. Thus, the guide surfaces 15a are used to guide positioning of the securing piece portion 81a.

Further, on the inner peripheral side surface of the lower end of the front side wall 51, there is formed a tapered surface 51e, as shown in FIG. 4, in order that the securing piece portion 81a can be disposed easily on the inner peripheral surface side of the front side wall 51.

The brackets 19 that will be inserted into the respective insertion grooves 51d and 52d comprise two brackets which are disposed on the front side wall 51 side and on the rear side wall 52 side, respectively. Each bracket 19 is formed from a shaped metal plate and include a mounting piece portion 19a with an insertion hole (not shown), into which the bolt 20a of the retainer 20 can be inserted, and an insertion piece portion 19b which extends upwardly from the mounting piece portion 19a and is inserted into the insertion groove 51d or 52d.

The assembling operation of the present air bag device M1 is as follows. The air bag 11 and inflator 12 are united together with the bag holder 16 by use of the bolts 20a of the retainer 20. Prior to this, the air bag 11 has been previously folded.

Figure 8:
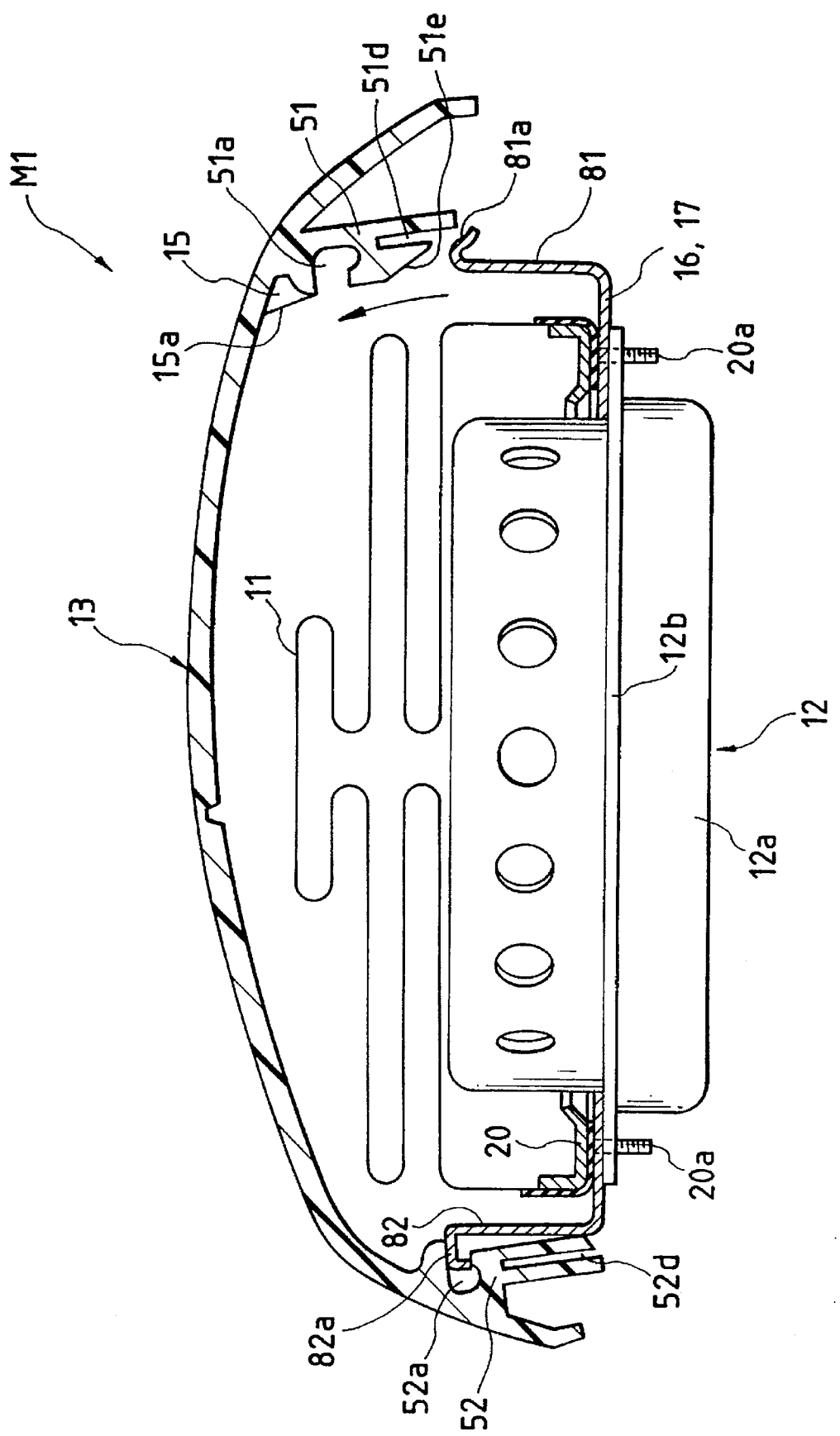
FIG. 8 is a cross-sectional view of the invention, showing the starting state of assembly.

Then, as shown in FIG. 8, the rear securing piece portion 82a of the rear vertical wall 82 is inserted into and secured to the rear securing groove 52a of the rear side wall 52 having the reduced opening width h5.

Even if the width dimension h5 of the opening 52c of the securing groove 52a is a little smaller than the height dimension H1 of the securing piece portion 82a, the portion of cover 13 that the securing piece portion 82a is inserted into and secured to is one of the four side walls 51–54, so that the inserting and securing operation can be carried out easily without taking much time and labor.

Using the thus secured portion as a fulcrum, the bag holder 16 is rotated upwardly as indicated by the arrow in FIG. 8. The side securing piece portions 83a and 84a of the right and left vertical walls 83 and 84 of the bag holder 16 are respectively secured to the securing projecting strips 53a and 54a of the right and left side walls 53 and 54 of the cover 13, and the front securing piece portion 81a of the front vertical wall 81 is inserted into and secured to its corresponding securing groove 51a of the front side wall 51 having the increased opening width h3.

The side securing piece portions 83a and 84a of the right and left vertical walls 83 and 84 of the bag holder 16 are also secured to the securing projecting strips 53a and 54a of the right and left side walls 53 and 54. The securing projecting strips 53a and 54a are different from securing grooves which have been used in the prior art since they are projections the top portions of which are opened. Consequently, if the right and left side walls 53 and 54 are spread a little, the side securing piece portions 83a and 84a can still be easily secured to the securing projecting strips 53a and 54a.

Insertion of and securing of the front securing piece portion 81a of the front vertical wall 81 into the front securing groove 51a also occurs easily, since the opening width h3 of the front securing groove 51a is set a little larger than the height dimension H1 of the front securing piece portion 81a of the front vertical wall 81. The front side wall 51, including the front securing groove 51a, is easy to spread outwardly if the right and side walls 53 and 54 are spread and are then restored to their original states. Accordingly, the front securing piece portion 81a can be easily fitted into and secured to the front securing groove 51a.

Thereafter, if the mounting piece portions 19a are mounted on the exteriors of the bolts 20a respectively, the insertion piece portions 19b of the front and rear brackets 19 are inserted into the insertion grooves 51d and 52d of the front and rear side walls 51 and 52, respectively, and nuts 21 are threadedly engaged with the bolts 20a. Then the cover 13 can be assembled to the bag holder 16, which completes the assembling operation of the air bag device M1.

Subsequently, use of the nuts 18 provided on the bag holder 16, the air bag device M1 may be mounted to the main body of the steering wheel W.

Therefore, in the air bag device M1 according to the present embodiment, after the rear securing piece portion 82a is inserted into and secured to the rear securing groove 52a having the reduced opening width h5, if, while rotating the bag holder 16, the right and left side walls 53 and 54 are spread a little right and left and the side securing piece portions 83a and 84a are secured to the right and left securing projecting strips 53a and 54a, and, at the same time, if the right and left side walls 53 and 54 are restored to their original states and the front securing piece portion 81a is inserted into and secured to the front securing groove 51a, then the cover 13 can be easily assembled to the bag holder 16. This improves the assembling operation of cover 13, with the result that the number of manufacturing steps as well as the manufacturing cost of the air bag device can be reduced.

Also, in the present embodiment, since the predetermined breakable portion 14a of the cover top wall 14 is arranged in a substantially H-like shape when the air bag 11 is expanded and thus the predetermined breakable portion 14a is broken, the four side walls 51 to 54 are pulled upwardly with the front and rear side walls 51 and 52 being pulled up strongly due to the development of the door portions 14b and 14c. However, these front and rear side walls 51 and 52 are also strongly held by the front and rear securing piece portions 81a and 82a, as well as by use of the brackets 19. Also, the right and left side walls 53 and 54 are prevented from moving upwardly by securing the side securing piece portions 83a and 84a to the securing projecting strips 53a and 54a. Further, because of this increased assembling strength of the cover 13 to the bag holder 16, even if the amount of gas discharged is increased to effect a rapid expansion of the air bag 11 can complete its expansion quickly without trouble.

Figure 9:
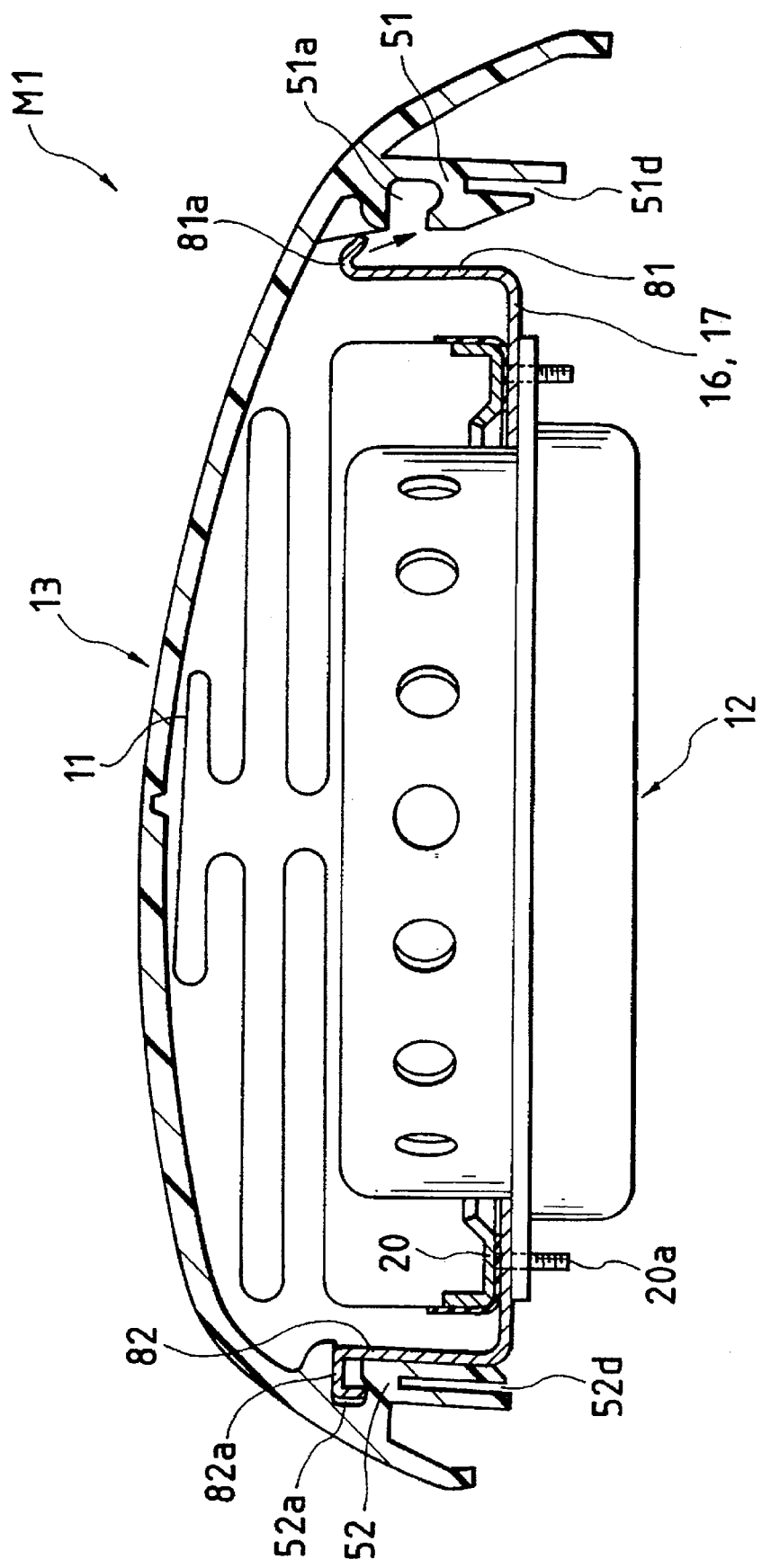
FIG. 9 is a cross-sectional view of the invention, showing the assembled state thereof.

Further, in the air bag device M1 according to the present embodiment, guide ribs 15 are positioned adjacent the upper edge of the front securing groove 51a of the front side wall 51 in the cover 13. Guide ribs 15 include guide surfaces 15a which are used to guide the front securing piece portion 81a. Due to this, when the front securing piece portion 81a is inserted into and secured to the front securing groove 51a of the front side wall 51, as shown in FIG. 9, if the front securing piece portion 81a is positioned higher than the front securing groove 51a and, after then, the front securing piece portion 81a is returned or moved downward, then the front securing piece portion 81a can be guided by the guide surface 15a and thus the front securing piece portion 81a can be easily inserted into the front securing groove 51a. This can further improve the assembly operation of cover 13.

Moreover, in the air bag device M1 according to the present embodiment, the side securing piece portions 83a and 84a include securing projections 83b and 84b. The securing projecting strips 53a and 54a are formed with insertion holes 53b and 54b into which the securing projections 83b and 84b can be inserted. Due to this, when the cover 13 is held by the bag holder 16, if the securing projections 83b and 84b are respectively inserted into the insertion holes 53b and 54b, then the right and left side walls 53 and 54 are prevented from spreading outwardly after the cover 13 is assembled. This arrangement stabilizes the holding relationship between the cover 13 by the bag holder 16.

In the present embodiment, there is shown a case in which the width dimension h5 of the opening 52c of the rear securing groove 52a in the rear side wall 52 of the cover 13 is set a little smaller than the height dimension H1 of the rear securing piece portion 82a. Also, the width dimension h3 of the opening 51c of the front securing groove 51a formed in the front side wall 51 is set a little larger than the height dimension H1 of the front securing piece portion 81a. However, it should be understood that the respective dimensions of the securing grooves 51a and 52a may also be set in the reversed manner and, in this case, the cover 13 may be assembled to the bag holder 16 from the portion thereof in which the width dimension of the opening thereof is set small. Also, in this case, the guide ribs 15 may be provided in the portion of the cover 13 in which the width dimension of the opening thereof is set large.

Also, in the present embodiment, there is shown a case in which the predetermined breakable portion 14a of the cover 13 is arranged in a substantially H-like shape when it is viewed from the top surface thereof. However, alternatively, the predetermined breaking portion 14a may be arranged in a substantially U-like shape when it is viewed from the top surface thereof. In this case, preferably, the front securing groove 51a of the front side wall 51 of the cover 13 formed on the hinge portion side of the door portion which will be broken and opened may be disposed on the side in which the width dimension of the opening thereof is set narrow so that the assembly strength of the cover 13 to the bag holder 16 can be assured.

Further, in the present embodiment, the holding of the cover 13 by the brackets 19 is also used in assembling the cover 13 to the bag holder 16. However, if the upward pulling forces of the respective side walls 51, 52, 53 and 54 of the cover 13 when the air bag 11 is expanded are small and thus the cover 13 can be held on the bag holder 16 sufficiently by means of the securing of the respective securing pieces 81a, 82, 83a and 84a, then the brackets 19 can be omitted.

Figure 10:
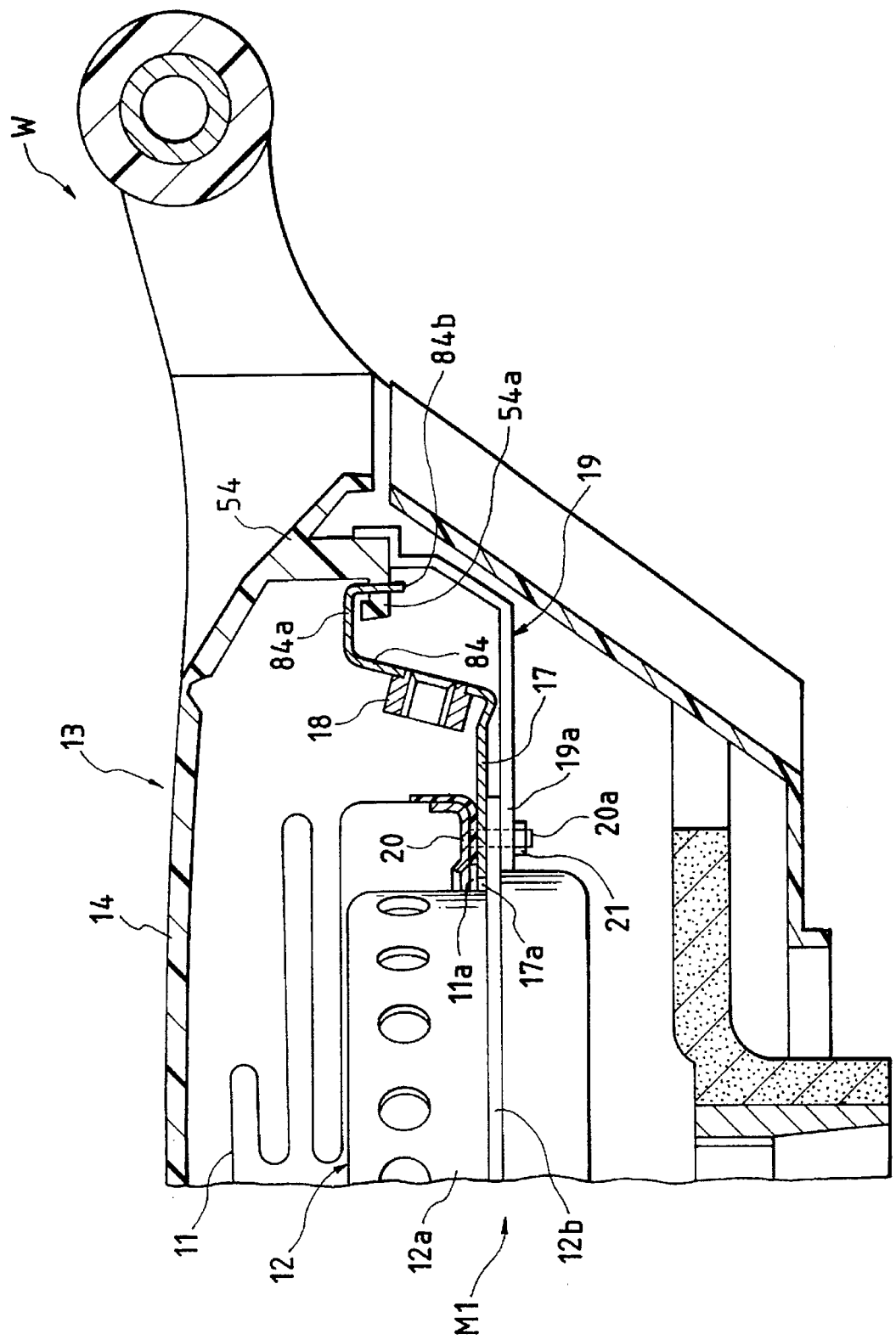
FIG. 10 is a cross-sectional view of another embodiment.

In the aforementioned embodiment, brackets 19 are used to strongly secure the front and rear securing piece portions 81a and 82a to the front and rear side walls 51 and 52 in a strong and positive manner. As another embodiment, the bracket 19 may be extended outwardly and upwardly and provide reinforcing the side wall, as shown at 54 in FIG. 10 and improve the securing of the side securing projections 83b and 84b in the penetration holes 53b and 54b.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. An air bag device comprising:
    (A) a folded air bag;
    (B) a cover for covering said air bag comprising:
        a top wall including a predetermined breakable portion that will be broken when said air bag is expanded; and
        four side walls including front, rear, right and left side walls respectively disposed about the periphery of said predetermined breakable portion and respectively extending downwardly from the lower surface of said top wall, there being formed securing grooves on the inner peripheral side surfaces of said front and rear side walls; and
    (C) a bag holder for holding said air bag comprising:
        a bottom wall; and
        four vertical walls extending upwardly from the respective front, rear, right and left peripheral edges of said bottom wall and disposed on the inner peripheral side surfaces of said respective side walls, said respective vertical walls including on the upper ends thereof securing piece portions that are bent downwardly on the outer peripheral surface sides of said respective vertical walls, said front and rear securing piece portions being inserted and secured to said securing grooves so that said cover being held by said bag holder;
        wherein the width dimension of an opening in said securing groove of one of said front and rear side walls is set to be substantially smaller than the height dimension of said securing piece portion, while the width dimension of said securing groove of the other of said front and rear side walls is set to be substantially larger than the height dimension of said securing piece portion, and securing projection strips are provided on the inner peripheral surface sides of said right and left side walls of said cover to which said right and left securing piece portions are secured.

2. The air bag device as set forth in claim 1, wherein said predetermined breakable portion of said cover is arranged in a substantially H-like shape as viewed from the top surface thereof, brackets fixed to said bag holder are respectively inserted into the lower end faces of said front and rear side walls of said cover, and said cover is held by said bag holder by securing said respective securing piece portions to said respective securing grooves as well as by holding said front and rear vertical walls and said brackets to said front and rear side walls.

3. The air bag device as set forth in claim 1, wherein said predetermined breakable portion of said cover is arranged in a substantially H-like shape as viewed from the top surface thereof, brackets fixed to said bag holder are respectively inserted into the lower end faces of said securing projecting strips, and said cover is held by said bag holder by securing said respective securing piece portions to said respective securing grooves as well as by holding said brackets to said securing projection strips.

4. The air bag device as set forth in claim 1, wherein a guide surface is formed adjacent the upper edge of said securing groove of the other of said side walls of said cover for guiding said securing piece portion of said corresponding vertical wall of said bag holder to said securing groove of the other of said side walls.

5. The air bag device as set forth in claim 1, wherein in said securing piece portions of said right and left vertical walls of said bag holder, there are provided securing projections which respectively project downward, and in said securing projecting strips of said right and left side walls of said cover, there are formed penetration holes into which said securing projections can be inserted.

6. An air bag device comprising:

a folded air bag;

a cover for covering said air bag, said cover having a top wall and four of front, rear, right and left side walls, said front and rear side walls respectively having securing grooves on the inner peripheral surface thereof; and a bag holder for holding said air bag, said bag holder having four of front, rear, right and left vertical walls, disposed on the inner surface of said respective side walls, and respectively having securing piece portions at the upper end thereof;

wherein said rear securing piece portion is inserted into and secured to said rear securing groove so as to be rotatable with a secured portion thereof as a fulcrum, and said front securing piece portion is inserted into and secured to said front securing groove so that said cover is held by said bag holder;

wherein the width dimension of the opening of said rear securing groove is substantially smaller than the height dimension of said rear securing piece portion and the width dimension of the opening of said front securing groove is substantially larger than the height dimension of said front securing piece portion.

7. The air bag device as set forth in claim 6 further comprising: brackets fixed to said bag holder, said brackets being respectively inserted into the lower end faces of said front and rear side walls of said cover, and said cover is held by said bag holder by securing said respective securing piece portions to said respective securing grooves as well as by holding said front and rear vertical walls and said brackets to said front and rear side walls.

8. The air bag device as set forth in claim 6 further comprising: securing projection strips formed on the inner peripheral surface of said right and left side walls of said cover, said right and left securing piece portions being secured to said securing projection strips.

9. The air bag device as set forth in claim 8 further comprising: brackets fixed to said bag holder, said brackets being respectively inserted into the lower end faces of said securing projecting strips, and said cover is held by said bag holder by securing said respective securing piece portions to said respective securing grooves as well as by holding said brackets to said securing projection strips.

10. The air bag device as set forth in claim 6, wherein a guide surface is formed adjacent the upper edge of said front securing groove for guiding said front securing piece portion to said front securing groove.

11. The air bag device as set forth in claim 6, wherein in said securing piece portions of said right and left vertical walls of said bag holder, there are provided securing projections which respectively project downward, and in said securing projecting strips of said right and left side walls of said cover, there are formed penetration holes into which said securing projections can be inserted.

* * * * *